(12) United States Patent
Yamamura (10) Patent No.: US 7,134,692 B2
(45) Date of Patent: Nov. 14, 2006

(54) IMPACT ABSORBING STRUCTURE FOR VEHICLE STEERING SYSTEMS

(75) Inventor: Mitsuji Yamamura, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 403 days.

(21) Appl. No.: 10/733,249

(22) Filed: Dec. 12, 2003

(65) Prior Publication Data

US 2004/0231450 A1    Nov. 25, 2004

(30) Foreign Application Priority Data

Dec. 25, 2002    (JP) ............................. 2002-373501

(51) Int. Cl.
*B60D 1/11*    (2006.01)
(52) U.S. Cl. .................................... 280/777
(58) Field of Classification Search ................ 280/777, 280/775; 74/492, 493
See application file for complete search history.

(56) References Cited

U.S. PATENT DOCUMENTS

| | | | | |
|---|---|---|---|---|
| 5,775,172 | A * | 7/1998 | Fevre et al. .................. 74/492 |
| 6,345,842 | B1 * | 2/2002 | Igarashi et al. ............. 280/775 |
| 6,378,903 | B1 * | 4/2002 | Yabutsuka et al. .......... 280/777 |
| 6,467,807 | B1 * | 10/2002 | Ikeda et al. ................. 280/775 |
| 6,631,924 | B1 * | 10/2003 | Nomura et al. ............. 280/777 |
| 6,726,248 | B1 * | 4/2004 | Satou et al. ................. 280/777 |
| 6,764,098 | B1 * | 7/2004 | Matsumoto et al. ........ 280/777 |
| 2002/0011724 | A1 * | 1/2002 | Satou et al. ................. 280/777 |
| 2002/0024210 | A1 * | 2/2002 | Nomura et al. ............. 280/777 |
| 2002/0167157 | A1 * | 11/2002 | Matsumoto et al. ........ 280/777 |
| 2004/0094945 | A1 * | 5/2004 | Sawada et al. ............. 280/777 |
| 2004/0195811 | A1 * | 10/2004 | Imamura et al. ............ 280/735 |
| 2005/0093284 | A1 * | 5/2005 | Sato et al. .................. 280/777 |
| 2005/0167962 | A1 * | 8/2005 | Sato et al. .................. 280/775 |
| 2005/0173912 | A1 * | 8/2005 | Nakano et al. ............. 280/777 |
| 2005/0269812 | A1 * | 12/2005 | Yamada ..................... 280/777 |

FOREIGN PATENT DOCUMENTS

JP    62-23771 U    2/1987

* cited by examiner

*Primary Examiner*—Paul N. Dickson
*Assistant Examiner*—Joselynn Y. Sliteris
(74) *Attorney, Agent, or Firm*—Foley & Lardner LLP (57) ABSTRACT

An impact absorbing structure for vehicle steering systems includes a support and release mechanism for a tilt rotation center which mechanism makes it easy to change an impact load bearing capacity in a head-on collision. A steering column and a steering shaft are coaxially coupled to each other and are longitudinally rigid against compression. The steering column is supported by an upper bracket which can be released from a vehicle body in response to an impact and by a lower bracket which defines a tilt rotation center. A notch which has an open side to the front of the vehicle is formed in the lower bracket. A pivot, which is rigidly coupled to the steering shaft and provides a center of the tilt rotation, is engaged with the notch including a protrusion near the closed end.

16 Claims, 7 Drawing Sheets

IMPACT ABSORBING STRUCTURE FOR VEHICLE STEERING SYSTEMS

BACKGROUND OF THE INVENTION

The present invention relates generally to impact absorbing structures for vehicle steering systems, and more particularly to support and release mechanisms for tilt pivots of tilt steering columns.

When a tilt steering system has an impact absorbing structure by being provided with a steering column and a steering shaft which are coaxially coupled to each other and have an axially collapsible structure, a tilt pivot of a tilt rotation is enough supported by being rotatably coupled with a hinge to a lower bracket (nearer to a steering gear) rigidly attached to a vehicle body.

On the other hand, when a tilt steering system is provided with a steering column and a steering shaft which are coaxially coupled to each other and do not have an axially collapsible structure, that is, have a rigid structure against compression, a tilt pivot of a tilt rotation can not be supported in the same way. If the tilt pivot is rotatably coupled with a hinge to a lower bracket rigidly attached to the vehicle body, an impact can not be absorbed by releasing the steering column from the lower bracket even while the steering column can be otherwise released from an upper bracket at the impact. The lower bracket may be applied with the same structure of the upper bracket to provide a release mechanism. This structure however raises a product cost.

Accordingly, a tilt rotation and an axially collapse are provided by coupling a steering column to a lower bracket with a support pin and a simple slot. One such tilt steering system has been disclosed in Japanese Utility Model Provisional Publication No. 62-23771 (Kinoshita) published Feb. 13, 1987 (hereinafter is referred to as "JP62-23771").

SUMMARY OF THE INVENTION

The aforementioned structure disclosed in JP62-23771, which provides a tilt rotation and an axial collapse by coupling a steering column to a lower bracket with a support pin and a simple slot, has difficulty of positioning a pivot center in the designed place, preventing a rattle, and changing an impact load bearing capacity in a head-on collision, in a support and release structure of a tilt rotation center of a steering column.

Accordingly, it is an object of the present invention to provide an impact absorbing structure for vehicle steering systems having a support structure of a tilt pivot which structure makes it easy to change an impact load bearing capacity.

In order to accomplish the aforementioned and other objects of the present invention, an impact absorbing structure for a tilt steering system of a vehicle comprises a steering shaft having a longitudinal rigidity against compression, a steering column having a longitudinal rigidity against compression, engaged coaxially and rigidly in a axial direction with the steering shaft, a pivot rigidly attached to the steering column, to be an axis of a tilt rotation of the steering column, an upper bracket rigidly attached to the steering column for temporarily allowing a tilt motion of the steering column, and adopted to be relatively moved away from a vehicle body in response to an impact, and a lower bracket having a notched portion defining a notch with an open end to a front of the vehicle body, rotatably engaged with the pivot in a closed end of the notch, for allowing the pivot being released from the notch in response to the impact. A protrusion may be formed on an inner periphery of the notch and located adjacent to the closed end of the notch to prevent the pivot from being released from the notch toward the front of the vehicle body. The protrusion may be formed in the lower side of the notched portion, and a deformable portion formed under the notch may include an opening and has a predetermined width and a predetermined height for impact absorption. A guide may be formed as a part of the lower bracket, abutting on an underside of the steering column, for preventing the steering column from falling off the lower bracket in response to the impact.

According to another aspect of the invention, an impact absorbing structure for a tilt steering system of a vehicle comprises a steering shaft having a longitudinal rigidity against compression, a steering column having a longitudinal rigidity against compression, engaged coaxially and rigidly in a axial direction with the steering shaft, a pivot rigidly attached to the steering column, to be an axis of a tilt rotation of the steering column, an upper bracket rigidly attached to the steering column for temporarily allowing a tilt motion of the steering column, and adopted to be relatively moved away from a vehicle body in response to an impact, a lower bracket having a notched portion defining a notch with an open end to a front of the vehicle body, rotatably engaged with the pivot in a closed end of the notch, for allowing the pivot being released from the notch in response to the impact, and the lower bracket comprising a deformable portion formed as an impact absorbing portion defining the notch, for being deformed by a release motion of the pivot, while absorbing an impact energy under a condition where an impact load is above an impact load bearing capacity of the deformable portion.

The above objects and other objects, features, and advantages of the present invention are readily apparent from the following detailed description of the best modes for carrying out the invention when taken in connection with the accompanying drawings.

DETAILED DESCRIPTION OF THE INVENTION

Referring now to the drawings, particularly to FIGS. 1 through 5, a steering shaft 2 is inserted into a steering column 1 and rotatably supported on bearings 3 and 4 rigidly attached to the inside of the steering column 1. Stoppers 5, 5 rigidly attached to the steering shaft 2 abut on the side portions of the inner race of the bearing 3. An upper bracket 6 couples the steering column 1 to a vehicle body, allowing a tilt action of the steering column 1. A joint cover 7 is connected to the lower end of the steering column 1. A lower bracket 8 couples the joint cover 7 to the vehicle body, allowing a tilt rotation and a detaching or release action of the joint cover 7. A universal joint 9 connects the steering shaft 2 to an intermediate shaft 10. A steering wheel (not shown) is attached to the upper end of the steering shaft 2.

Figure 1:
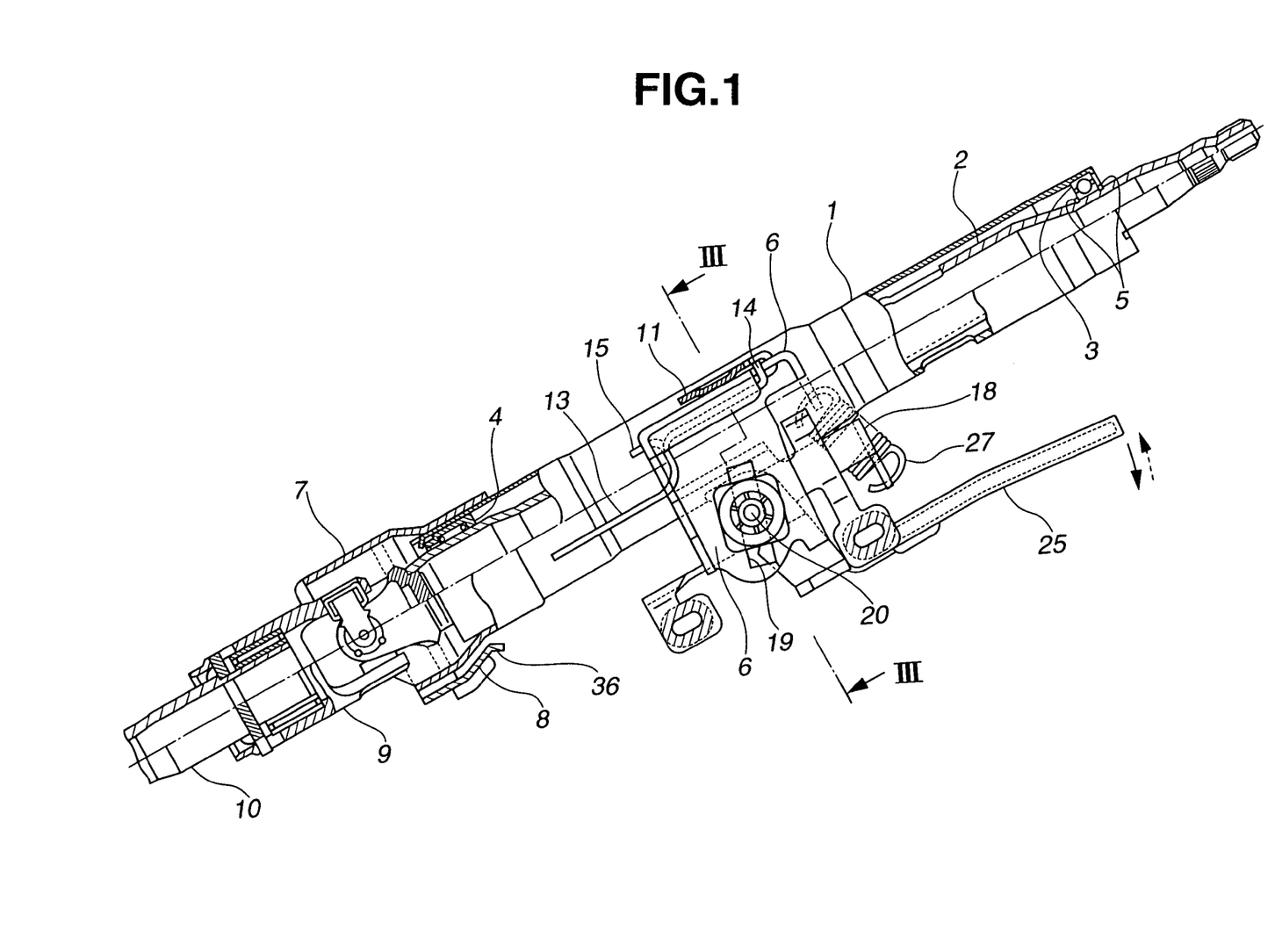
FIG. 1 is a side view of an embodiment of an impact absorbing structure for vehicle steering systems.
Figure 2:
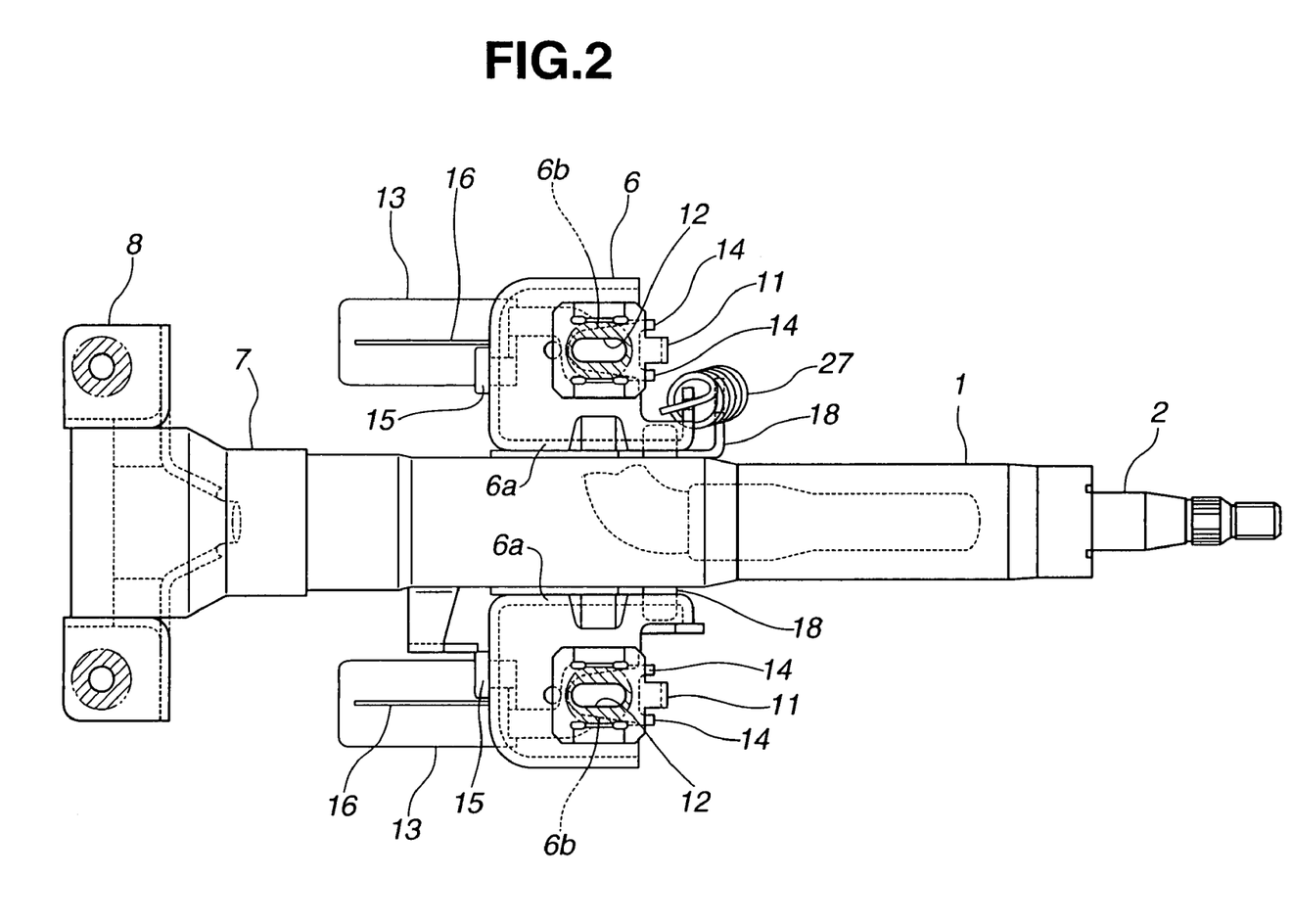
FIG. 2 is a plan view of the embodiment of an impact absorbing structure for vehicle steering systems.
Figure 3:
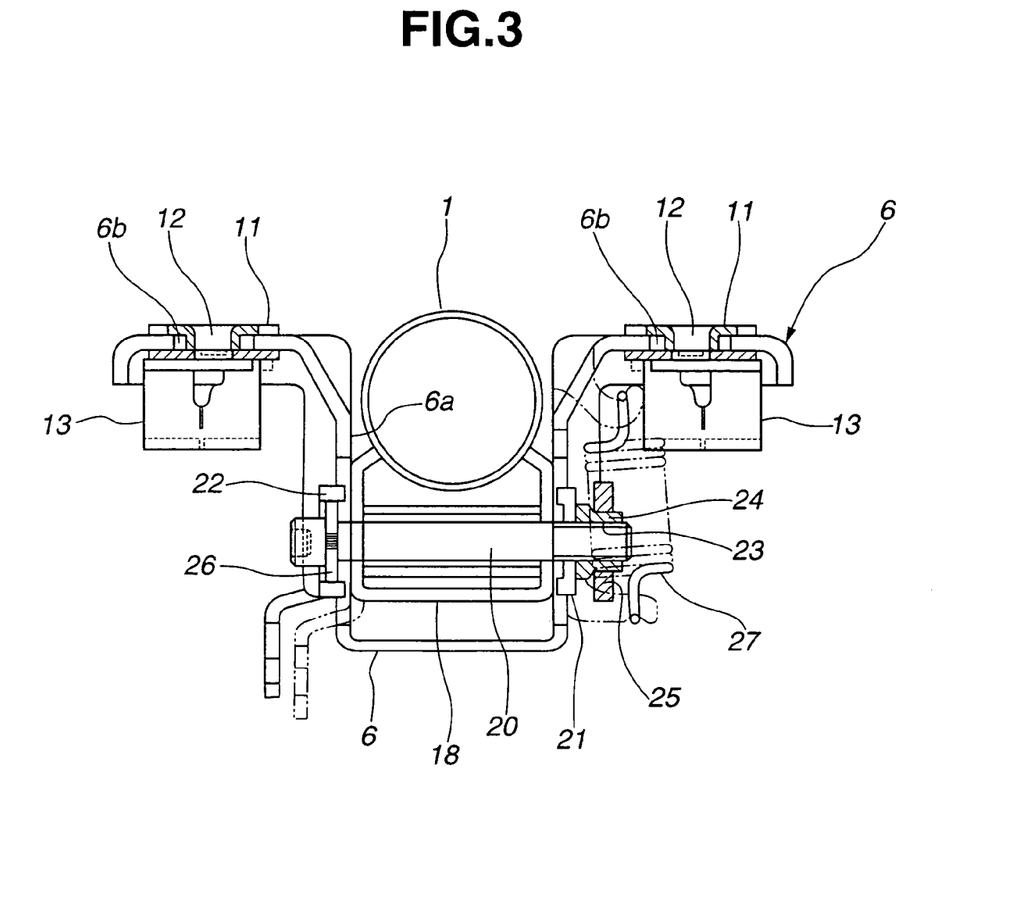
FIG. 3 is a cross-sectional view taken along the plane indicated by the line III—III in FIG. 1 depicting a structure around an upper bracket.
Figure 4:
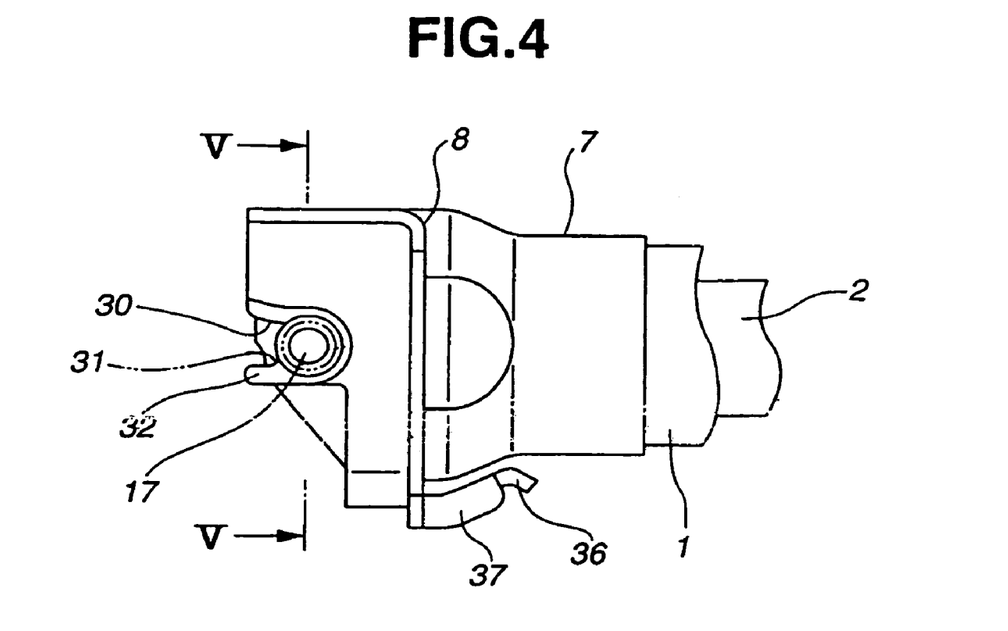
FIG. 4 is a partially enlarged drawing of FIG. 1 depicting a structure around a lower bracket.
Figure 5:
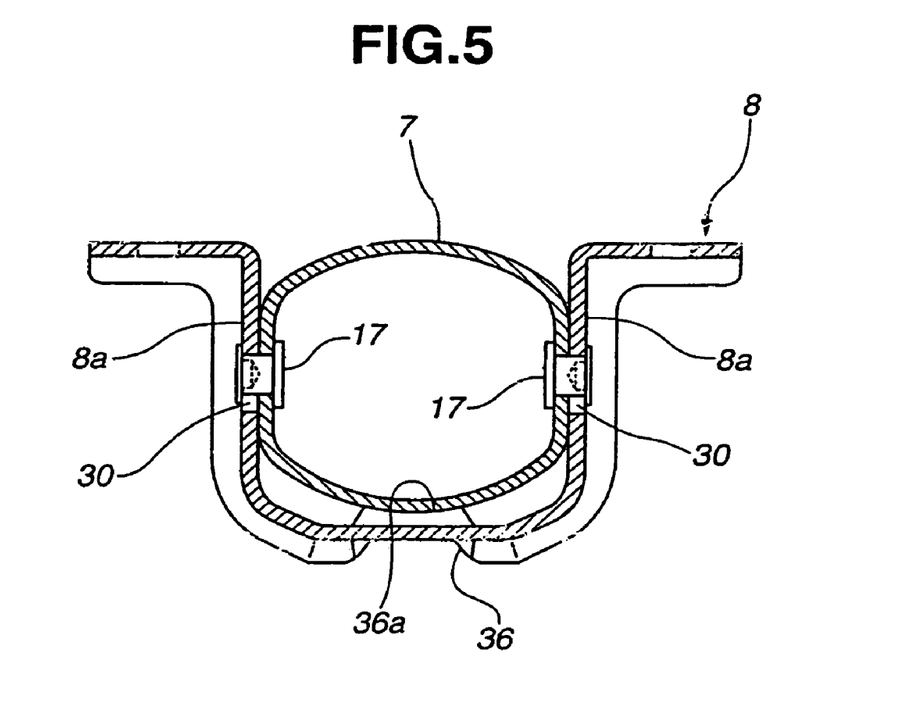
FIG. 5 is a cross-sectional view taken along the plane indicated by the line V—V in FIG. 4.

As shown in FIGS. 1 through 3, a V-shaped slot 6b which has an open side to the rear of the vehicle is provided in each mounting portion of the upper bracket 6. A slider 11, which has a U-shaped form in a side view, sandwiches each mounting portion in the thickness direction, covering the V-shaped slot 6b from the back edge of the upper bracket 6. The slider 11 includes an insertion slot 12 for a body-mounting bolt (not shown). An impact absorbing element 13, which has a hole corresponding to the insertion slot 12, is provided abutting at one end on the underside of the slider 11.

The impact absorbing element 13 is comprised of a plate which has a r-shaped form (refer to FIG. 1) in a side view. One end of the impact absorbing element 13 is formed as hook-shaped to define hooks 14, 14. The hooks 14, 14 of the impact absorbing element 13 catch the back side of the slider 11. The other end of the impact absorbing element 13, which has a T-shaped form (refer to FIG. 2) in a plan view, is formed as a detachment stopper 15 passing through a stepped hole (not shown) defined in the front side of the upper bracket 6.

When a load toward the front of the vehicle acts on the upper bracket 6, one end of the impact absorbing element 13, that is, the hooks 14, 14 keeps fixed to the slider 11 which is left on the vehicle body, and the other end, that is, the detachment stopper 15 moves forward according to the upper bracket 6. In this action, an impact energy is absorbed by tearing the impact absorbing element 13 along a ripping guide 16.

The upper bracket 6 includes a tilt structure, where the steering column 1 can rotate on an axis of a pivot 17 (refer to FIG. 4) of the lower bracket 8. More specifically as shown in FIGS. 1 and 3, a distance bracket 18 rigidly attached at an upper end on to the steering column 1 is inserted between side plates 6a, 6a of the upper bracket 6. A tilt bolt 20 is provided passing through the distance bracket 18 and slots 19, 19 provided in the bracket side plates 6a, 6a.

Operating a tilt lever 25 moves the bracket side plates 6a, 6a in a direction of clamping or releasing. In order to provide this mechanism, the tilt lever 25 is rigidly attached to a nut 24 which is engaged with a threaded portion 23 of the tilt bolt 20. Clamp elements 21 and 22 are engaged with the slots 19, 19 at the ends of the tilt bolt 20. The clamp element 21, abutting on the tilt lever 25, limits a rotation of the tilt lever 25. The clamp element 22, which is engaged both with a flange 26 of the tilt bolt 20 and with the slot 19, prevents a rotation of the tilt bolt 20.

In this construction, a tilt angle is set as follows. When the tilt lever 25 is moved in the direction of the solid arrow shown in FIG. 1, the nut 24 moves outside along the threaded portion 23 of the tilt bolt 20 to disengage the bracket side plates 6a, 6a from each other. The bracket side plates 6a, 6a thus release the distance bracket 18. A tensile spring 27 is mounted at one end to the distance bracket 18 and at the other end to the upper bracket 6. For this structure, the steering column 1 moves itself up to a maximum of the tilt angle.

When the steering column 1 is pushed down against a force of the tensile spring 27 to lower the distance bracket 18, the tilt angle of the steering column 1 can be desirably set within a range where a stroke of the tilt bolt 20 is allowed by the slot 19. When the tilt lever 25 is moved in the direction of the dotted arrow shown in FIG. 1, the nut 24 moves inside along the threaded portion 23 of the tilt bolt 20 to clamp the bracket side plates 6a, 6a to each other. The bracket side plates 6a, 6a thus clamp the distance bracket 18 to keep the tilt angle.

Figure 6:
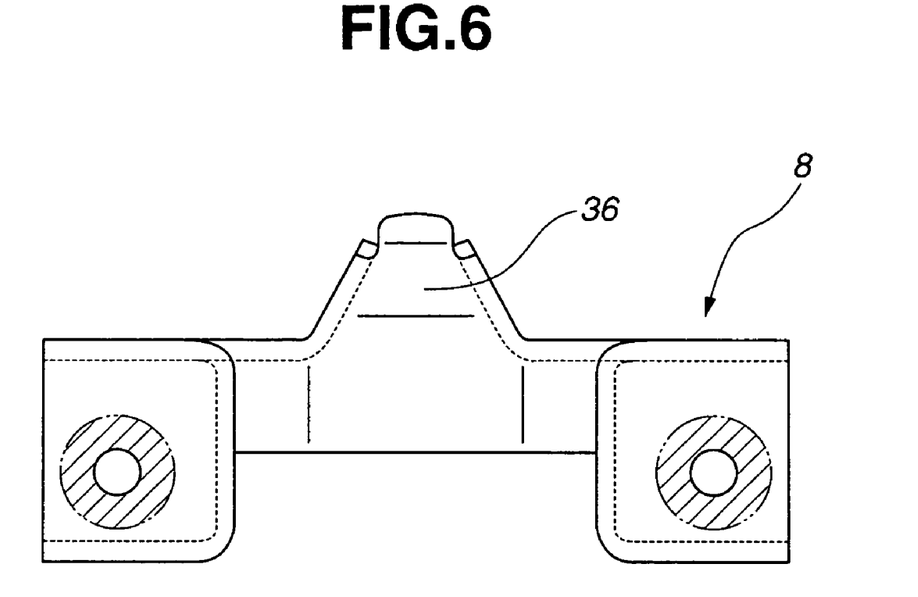
FIG. 6 is a plan view of the lower bracket.
Figure 7:
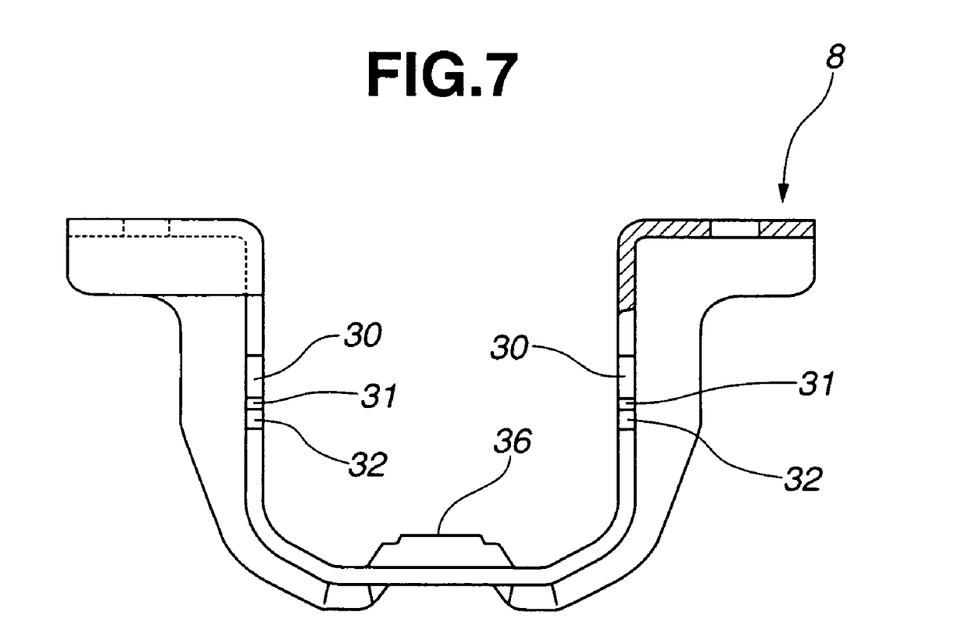
FIG. 7 is a front view of the lower bracket.
Figure 8:
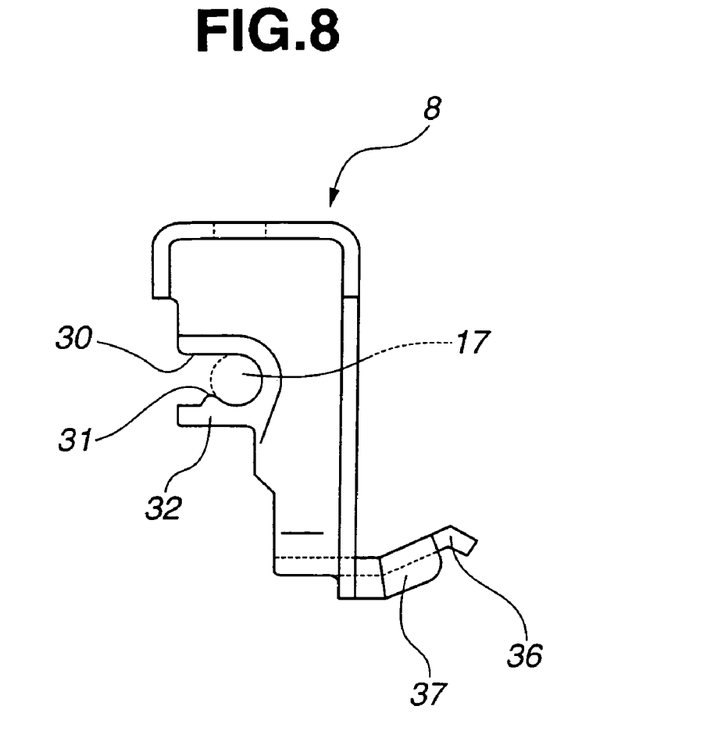
FIG. 8 is a side view of the lower bracket.

The lower bracket 8 is depict in FIGS. 6 through 8. The joint cover 7 connected to the steering column 1 is inserted between side plates 8a, 8a of the lower bracket 8. The side portions of the joint cover 7 are rotatably coupled to the bracket side plates 8a, 8a with the pivots 17, 17 which are comprised of caulked pins and rigidly attached to the joint cover 7.

The pivot 17 is engaged with a notch 30 which is formed as U-shaped with an open end to the front of the vehicle body in the side plate 8a. When the steering column 1 and the joint cover 7 relatively move toward the front of the vehicle, the joint cover 7 with the pivot 17 can be released from the lower bracket 8. As shown in FIG. 8, a deformable portion 32 with a protrusion 31 is further formed in the lower side of the notch 30, in order to position the pivot 17, to prevent the pivot 17 from rattling, and to absorb an impact force.

The deformable portion 32 is formed so that the pivot 17 relatively moves forward against the protrusion 31 of the deformable portion 32, when a driver hits the steering wheel in a head-on collision and an impact load acts through the steering shaft 2 on the steering column 1 and the joint cover 7 connected to the steering column 1. The deformable portion 32 is deformed by a release motion of the pivot 17, while absorbing an impact energy under a condition where an impact load is above an impact load bearing capacity of the deformable portion 32.

The protrusion 31 is formed on an inner periphery of the notch 30 and located adjacent to the closed end of the notch 30. The protrusion 31 positions and supports the pivot 17 accurately in a designed place during no impact load or a normal driving load acting on the protrusion 31. The protrusion 31 is preferably shaped in part to be fitted to the pivot 17, for positioning the pivot 17 and preventing the pivot 17 to rattle. A proportion of the periphery of the pivot 17 abutting on the lower bracket 8 is determined to position the pivot 17, to prevent the pivot 17 rattling and to provide a predetermined impact load bearing capacity and a predetermined impact absorbing energy of the deformable portion 32. The protrusion 31 may be formed in a lower side or an upper side of the notch 30.

Figure 9:
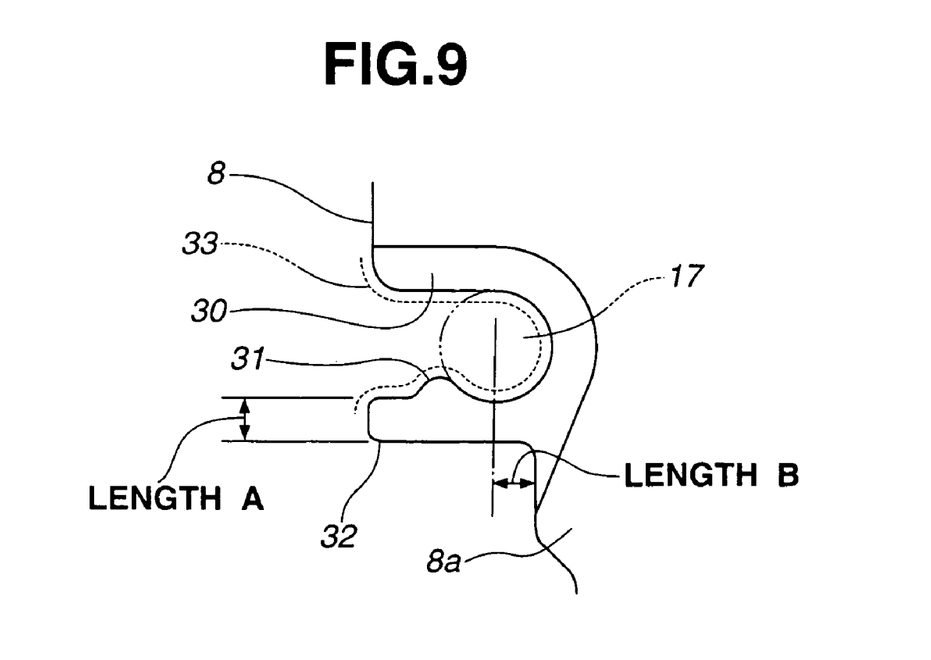
FIG. 9 is an enlarged side view of the lower bracket.

An impact load bearing capacity or a threshold impact load and an impact absorbing energy of the deformable portion 32 is easily determined by setting a width of the deformable portion 32 or a length A, and a height of the deformable portion 32 or a length B. Specifically as shown in FIG. 9, the impact load bearing capacity is increased by a combination of increasing the length A and decreasing the length B, while the impact load bearing capacity is decreased by a combination of opposite changes. The impact absorbing energy is increased by a combination of increasing the length A, decreasing the length B and increasing the height of the protrusion 31, while the impact absorbing energy is decreased by a combination of opposite changes.

Figure 10:
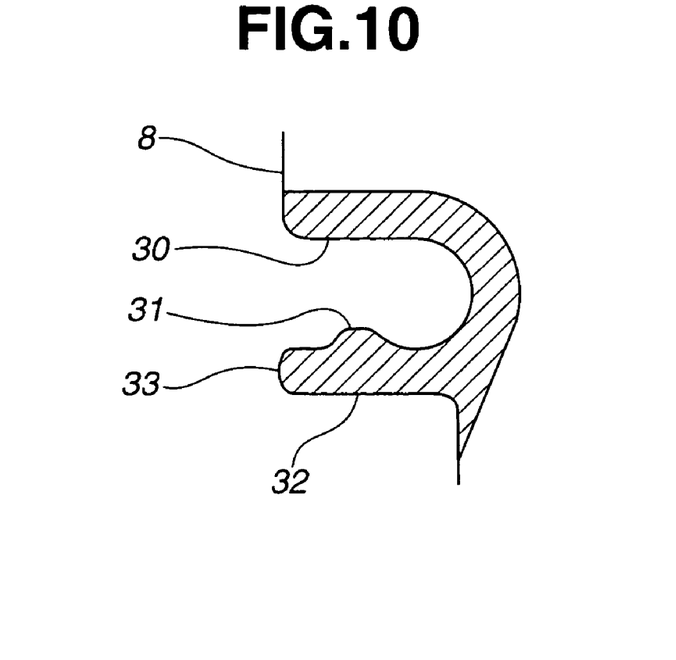
FIG. 10 is a diagrammatic sketch of an enlarged side view of the lower bracket.
Figure 11:
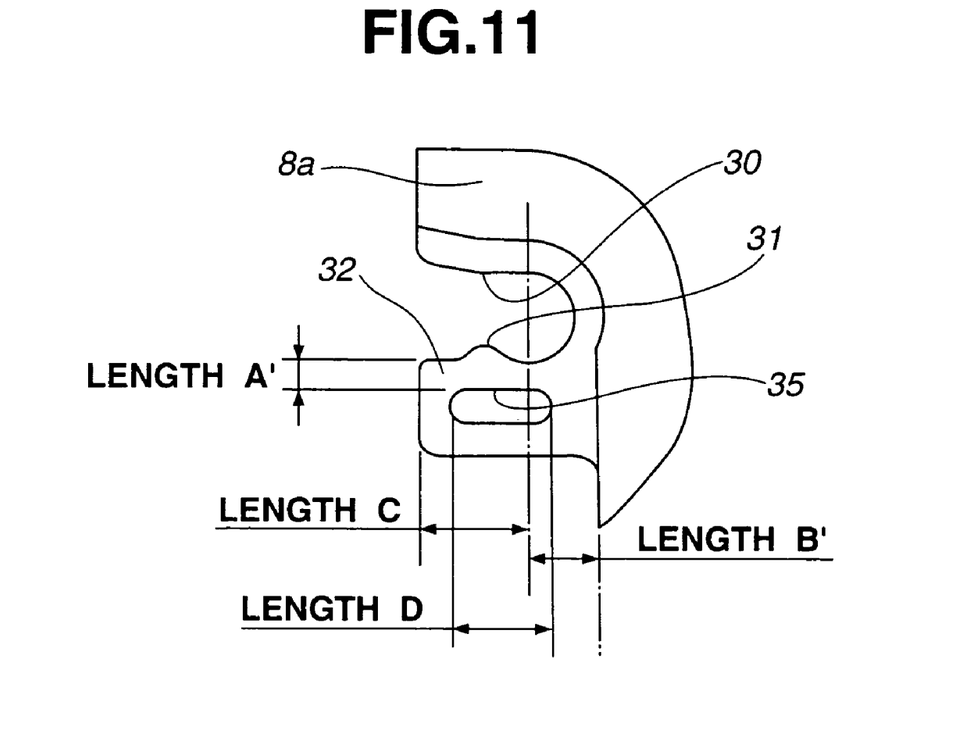
FIG. 11 is an enlarged side view of an another embodiment of a lower bracket.

As shown in FIGS. 9 and 10, machining precisions of smoothness and parallelism are especially enhanced in the protrusion 31 and the periphery 33 of the protrusion 31. Additionally as shown in FIG. 11, the deformable portion 32 may be optionally widened and provided with an opening 35. These constructions make it easy to set an impact load bearing capacity by adjusting dimensions such as lengths A', B', C and D. For instance as shown in FIG. 11, a release timing when the steering column 1 is released from the vehicle body, or the pivot 17 is released from the notch 30 of the lower bracket 8, can be determined by setting the length C. Specifically, the release timing is delayed by increasing the length C, while the release timing is advanced by decreasing the length C. An impact load bearing capacity and an impact absorbing energy of the deformable portion 32 are also determined as follows. The impact load bearing capacity is increased by a combination of increasing the length A', decreasing the length B' and decreasing the length D, while the impact load bearing capacity is decreased by a combination of opposite changes. The impact absorbing energy is increased by a combination of increasing the length A', decreasing the length D and increasing the height of the protrusion 31, while the impact absorbing energy is decreased by a combination of opposite changes.

When a driver hits the steering wheel in a head-on collision, an impact force from the steering shaft 2 acts on the steering column 1 through the stoppers 5, 5 and the bearing 3. The upper bracket 6 relatively moves toward the front of the vehicle and is released from the vehicle body, leaving the sliders 11, 11 on the vehicle body. The pivot 17 of the joint cover 7 connected to the steering column 1 also relatively moves forward against or beyond the protrusions 31, 31. Accordingly, the steering column 1 and the steering wheel relatively move forward and are released from the vehicle body to prevent a larger impact force from acting on the driver.

As shown in FIGS. 1, 4, 7 and 8, a guide 36 is formed as a part of the lower bracket 8, extending upward toward the rear of the vehicle. A flange 37 is formed in each side of the guide 36 to reinforce the structure of the guide 36. The guide 36 has a cylindrically hollowed surface 36a fitted to the underside of the steering column 1 to allow the steering column 1 to move smoothly abutting on the guide 36 for impact energy absorption. When an impact force acts and the steering column 1 and the joint cover 7 relatively move toward the front of the vehicle, the pivot 17 is released from the notch 30. The joint cover 7 and the steering column 1, abutting on the guide 36 by their lower sides, move toward the front of the vehicle being guided by the guide 36. Accordingly, the steering column 1 is prevented from falling off, and the joint cover 7 and the steering column 1 move forward along the previous axis of the steering column 1. Without the guide 36, the steering column 1 stands up, that is, increases a tilt angle over a maximum under a normal condition during relatively moving toward the front of the vehicle. There is a possibility that an airbag can not properly operate to guard a driver as a result. The guide 36 prevents the steering column 1 from standing up and the airbag guards a driver accordingly.

The aforementioned structure of the embodiment makes it easy to position a pivot, to prevent a rattle and to change an impact load bearing capacity in a head-on collision, in a structure of a tilt rotation center of a steering column. Consequently, this steering structure can be properly applied to various vehicle structures. In addition, a timing of a steering column releasing can be properly set by adjusting dimensions of an opening of a deformed portion. A guide is further formed in a lower bracket so that the guide prevents the steering column 1 from standing up and an airbag guards a driver accordingly.

The entire contents of Japanese Patent Application No. 2002-373501 (filed Dec. 25, 2002) are incorporated herein by reference.

While the foregoing is a description of the preferred embodiments carried out in the invention, it will be understood that the invention is not limited to the particular embodiments shown and described herein, but that various changes and modifications may be made without departing from the scope or spirit of this invention as defined by the following claims.

What is claimed is:

1. An impact absorbing structure for a tilt steering system of a vehicle, comprising:
   a steering shaft having a longitudinal rigidity against compression;
   a steering column having a longitudinal rigidity against compression, engaged coaxially and rigidly in an axial direction with the steering shaft;
   a pivot rigidly attached to the steering column, to be an axis of a tilt rotation of the steering column;
   an upper bracket rigidly attached to the steering column for temporarily allowing a tilt motion of the steering column, and adapted to be relatively moved away from a vehicle body in response to an impact;
   a lower bracket having a notched portion defining a notch with an open end to a front of the vehicle body, rotatably engaged with the pivot in a closed end of the notch, for allowing the pivot being released from the notch in response to the impact; and
   a protrusion formed on an inner periphery of the notch and located adjacent to the closed end of the notch to prevent the pivot from being released from the notch toward the front of the vehicle body.

2. The impact absorbing structure for a tilt steering system of a vehicle as claimed in claim 1 wherein:
   the protrusion is formed in the lower side of the notched portion; and
   a deformable portion formed under the notch includes an opening and has a predetermined width and a predetermined height for impact absorption.

3. An impact absorbing structure for a tilt steering system of a vehicle, comprising:
   a steering shaft having a longitudinal rigidity against compression;
   a steering column having a longitudinal rigidity against compression, engaged coaxially and rigidly in an axial direction with the steering shaft;
   a pivot rigidly attached to the steering column, to be an axis of a tilt rotation of the steering column;
   an upper bracket rigidly attached to the steering column for temporarily allowing a tilt motion of the steering column, and adapted to be relatively moved away from a vehicle body in response to an impact;
   a lower bracket having a notched portion defining a notch with an open end to a front of the vehicle body, rotatably engaged with the pivot in a closed end of the notch, for allowing the pivot being released from the notch in response to the impact; and
   a guide formed as a part of the lower bracket, abutting on an underside of the steering column, for preventing the steering column from falling off the lower bracket in response to the impact.

4. An impact absorbing structure for a tilt steering system of a vehicle comprising:

a steering shaft having a longitudinal rigidity against compression;

a steering column having a longitudinal rigidity against compression, engaged coaxially and rigidly in an axial direction with the steering shaft;

a pivot rigidly attached to the steering column, to be an axis of a tilt rotation of the steering column;

an upper bracket rigidly attached to the steering column for temporarily allowing a tilt motion of the steering column, and adapted to be relatively moved away from a vehicle body in response to an impact;

a lower bracket having a notched portion defining a notch with an open end to a front of the vehicle body, rotatably engaged with the pivot in a closed end of the notch, for allowing the pivot being released from the notch in response to the impact; and the lower bracket comprising a deformable portion formed as an impact absorbing portion defining the notch, for being deformed by a release motion of the pivot, while absorbing an impact energy under a condition where an impact load is above an impact load bearing capacity of the deformable portion.

5. The impact absorbing structure for a tilt steering system of a vehicle as claimed in claim 4 further comprising:

a protrusion formed on an inner periphery of the notch and located adjacent to the closed end of the notch to prevent the pivot from being released from the notch toward the front of the vehicle body.

6. The impact absorbing structure for a tilt steering system of a vehicle as claimed in claim 5 wherein:

the protrusion is shaped in part to be fitted to the pivot, for positioning the pivot and preventing the pivot to rattle.

7. The impact absorbing structure for a tilt steering system of a vehicle as claimed in claim 6 wherein:

the pivot abuts on the lower bracket by a predetermined proportion of the periphery of the pivot, the predetermined proportion being determined to position the pivot, to prevent the pivot rattling and to provide a predetermined impact load bearing capacity and a predetermined impact absorbing energy of the deformable portion.

8. The impact absorbing structure for a tilt steering system of a vehicle as claimed in claim 5 wherein:

the protrusion is formed in a lower side of the notch.

9. The impact absorbing structure for a tilt steering system of a vehicle as claimed in claim 5 wherein:

the deformable portion includes an opening which is dimensioned to provide a predetermined timing when the pivot is released from the notch of the lower bracket.

10. The impact absorbing structure for a tilt steering system of a vehicle as claimed in claim 5 wherein:

the deformable portion of the lower bracket is formed by determining a first length as a width of the deformable portion along a first direction perpendicular both to a forward direction of the vehicle body and to an axial direction of the pivot, a second length along the forward direction of the vehicle body from a rear end of the deformable portion to a center of the pivot, and a third length as a height of the protrusion along the first direction, the lengths being determined to provide a predetermined impact load bearing capacity and a predetermined impact absorbing energy of the deformable portion.

11. The impact absorbing structure for a tilt steering system of a vehicle as claimed in claim 10 wherein:

the predetermined impact load bearing capacity is increased by a combination of increasing the first length and decreasing the second length, while the predetermined impact load bearing capacity is decreased by a combination of opposite changes; and the predetermined impact absorbing energy is increased by a combination of increasing the first length, decreasing the second length and increasing the third length, while the predetermined impact absorbing energy is decreased by a combination of opposite changes.

12. The impact absorbing structure for a tilt steering system of a vehicle as claimed in claim 5 wherein:

the protrusion is formed in the deformable portion; and the deformable portion includes an opening and has a predetermined width and a predetermined height for impact absorption.

13. The impact absorbing structure for a tilt steering system of a vehicle as claimed in claim 12 wherein:

the deformable portion of the lower bracket is formed by determining a first length along a first direction perpendicular both to a forward direction of the vehicle body and to an axial direction of the pivot from the opening to the notch, a second length along the forward direction of the vehicle body from a rear end of the deformable portion to a center of the pivot, a third length as a height of the protrusion along the first direction, a fourth length along the forward direction of the vehicle body from a center of the pivot to a front end of the deformable portion, and a fifth length as a height of the opening along the forward direction of the vehicle body, the lengths being determined to provide a predetermined impact load bearing capacity, a predetermined impact absorbing energy of the deformable portion, and a predetermined release timing when the pivot is released from the notch of the lower bracket.

14. The impact absorbing structure for a tilt steering system of a vehicle as claimed in claim 13 wherein:

the predetermined impact load bearing capacity is increased by a combination of increasing the first length, decreasing the second length and decreasing the fifth length, while the predetermined impact load bearing capacity is decreased by a combination of opposite changes;

the predetermined impact absorbing energy is increased by a combination of increasing the first length, decreasing the fifth length and increasing the third length, while the predetermined impact absorbing energy is decreased by a combination of opposite changes; and the predetermined release timing is delayed by increasing the fourth length, while the predetermined release timing is advanced by decreasing the fourth length.

15. The impact absorbing structure for a tilt steering system of a vehicle as claimed in claim 4 further comprising:

a guide formed as a part of the lower bracket, abutting on an underside of the steering column, for preventing the steering column from falling off the lower bracket in response to the impact.

16. The impact absorbing structure for a tilt steering system of a vehicle as claimed in claim 15 wherein:

the guide comprises a cylindrically hollowed surface fitted to the underside of the steering column, for allowing the steering column to move smoothly abutting on the guide for impact energy absorption in response to the impact.

* * * * *